United States Patent
Tang et al.

(10) Patent No.: US 10,382,258 B2
(45) Date of Patent: Aug. 13, 2019

(54) VIRAL SYSTEM DISCOVERY AND INSTALLATION FOR DISTRIBUTED NETWORKS

(71) Applicant: Western Digital Technologies, Inc., San Jose, CA (US)

(72) Inventors: Nina Tang, Saratoga, CA (US); Steven Lang, San Jose, CA (US); Artem Gavrilov, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 71 days.

(21) Appl. No.: 15/660,763

(22) Filed: Jul. 26, 2017

(65) Prior Publication Data

US 2018/0331895 A1    Nov. 15, 2018

Related U.S. Application Data

(60) Provisional application No. 62/505,107, filed on May 11, 2017.

(51) Int. Cl.
*H04L 12/24* (2006.01)
*H04L 29/08* (2006.01)

(52) U.S. Cl.
CPC ...... *H04L 41/0803* (2013.01); *H04L 67/1097* (2013.01); *H04L 41/084* (2013.01); *H04L 69/325* (2013.01)

(58) Field of Classification Search
None
See application file for complete search history.

(56) References Cited

U.S. PATENT DOCUMENTS

| 6,219,669 | B1* | 4/2001 | Haff .................. H04L 29/06 |
| 6,345,294 | B1  | 2/2002 | O'Toole et al. |
| 8,484,635 | B1  | 7/2013 | He et al. |
| 8,910,156 | B1  | 12/2014 | Kenchammana-Hosekote et al. |

(Continued)

FOREIGN PATENT DOCUMENTS

| EP | 1009130 A1 | 6/2000 |
| EP | 2728470 B1 | 9/2015 |

OTHER PUBLICATIONS

Anonymous "Extreme Cloud Administration Toolkit (xCAT)" dated 2015, 1 page, IBM.

(Continued)

*Primary Examiner* — Eunsook Choi
(74) *Attorney, Agent, or Firm* — Patent Law Works LLP

(57) ABSTRACT

An example implementation includes a system having a network configuration generator, a first computing rack, and a second computing rack. The network configuration receives network configuration information for a first plurality of nodes and a second plurality of nodes, and generates a network configuration file including network configuration information for the first plurality of nodes and the second plurality of nodes. The first plurality of nodes includes a first configuration node to receive the network configuration file, identify network configuration information for the first plurality of nodes in the network configuration file as being part of the first computing rack, and update network configuration for the first plurality of nodes based on the identified network configuration information for the first computing rack.

20 Claims, 10 Drawing Sheets

(56) References Cited

U.S. PATENT DOCUMENTS

| | | | |
|---|---|---|---|
| 9,430,262 B1 | 8/2016 | Felstaine et al. | |
| 9,641,394 B2 | 5/2017 | Jubran et al. | |
| 9,697,172 B1 | 7/2017 | Somohano et al. | |
| 2003/0208656 A1 | 11/2003 | Hawkins | |
| 2003/0233594 A1* | 12/2003 | Earl | G06F 11/0709 |
| | | | 714/4.11 |
| 2004/0249904 A1 | 12/2004 | Moore et al. | |
| 2006/0069770 A1* | 3/2006 | Stienhans | H04L 51/14 |
| | | | 709/224 |
| 2006/0168196 A1 | 7/2006 | Herbert et al. | |
| 2006/0271647 A1 | 11/2006 | Tindall et al. | |
| 2008/0082809 A1 | 4/2008 | Rothman et al. | |
| 2009/0040964 A1* | 2/2009 | Zhao | H04L 29/12311 |
| | | | 370/328 |
| 2009/0319650 A1 | 12/2009 | Collins et al. | |
| 2010/0138642 A1 | 6/2010 | Cherian et al. | |
| 2011/0158088 A1 | 6/2011 | Lofstrand et al. | |
| 2012/0233668 A1* | 9/2012 | Leafe | G06F 9/44526 |
| | | | 726/4 |
| 2012/0311111 A1 | 12/2012 | Frew et al. | |
| 2013/0198346 A1 | 8/2013 | Jubran et al. | |
| 2013/0227558 A1 | 8/2013 | Du et al. | |
| 2014/0047084 A1 | 2/2014 | Breternitz et al. | |
| 2014/0064283 A1 | 3/2014 | Balus et al. | |
| 2014/0173060 A1 | 6/2014 | Jubran et al. | |
| 2015/0052228 A1 | 2/2015 | Rousseau et al. | |
| 2015/0312802 A1 | 10/2015 | Shah et al. | |
| 2016/0014073 A1 | 1/2016 | Reddy et al. | |
| 2016/0142375 A1 | 5/2016 | Tubi et al. | |
| 2016/0253244 A1 | 9/2016 | Zhang et al. | |
| 2016/0291999 A1 | 10/2016 | Antony et al. | |
| 2016/0364204 A1* | 12/2016 | Rasmussen | G06F 3/165 |
| 2017/0054603 A1 | 2/2017 | Kulkarni et al. | |
| 2017/0126505 A1 | 5/2017 | Cencini et al. | |
| 2017/0149880 A1 | 5/2017 | Lochhead et al. | |
| 2017/0264493 A1 | 9/2017 | Cencini et al. | |
| 2017/0371756 A1 | 12/2017 | Hanson et al. | |
| 2018/0034769 A1 | 2/2018 | Modi et al. | |

OTHER PUBLICATIONS

Aumage, et al., MPICH/MADIII: a Cluster of Clusters-Enabled MPI Implementation, Third IEEE International Symposium on Cluster Computing and the Grid, Dec. 4, 2008 (8 pages).

Gilaberte, et al., Self-configuraiton of spontaneous networks by context-aware mechanisms, Networking and Services, Fifth International Conference on IEEE, 2009 (6 pages).

Richling, et al., Operating two InfiniBand grid clusters over 28 km distance, International Journal of Grid and Utility Computing, 2010 (8 pages).

Yoon et al., A Modeling Component for SSF based Network Simulation Package, Signal Processing and Communication Systems, 2nd International Conference on IEEE, 2008 (6 pages).

Zeidner, Server Networks: Software Integration Tools for CIM, Computer Integrated Manufacturing, International Conference on. IEEE, 1988 (10 pages).

International Search Report and Written Opinion, PCT/IB2017/001133, dated Dec. 12, 2017 (15 pages).

* cited by examiner

VIRAL SYSTEM DISCOVERY AND INSTALLATION FOR DISTRIBUTED NETWORKS

CROSS-REFERENCE TO RELATED APPLICATION(S)

The present application claims priority, under 35 U.S.C. § 119, of U.S. Provisional Patent Application No. 62/505,107, which was filed on May 11, 2017, and is titled "Viral System Discovery and Installation for Distributed Networks." U.S. Provisional Patent Application No. 62/505,107 is incorporated herein by reference in its entirety.

TECHNICAL FIELD

The present disclosure generally relates to distributed networks. In a more particular non-limiting example, the present disclosure relates to automatically discovering nodes in distributed computing systems.

BACKGROUND

Distributed computing systems are large-scale computer systems that contain a large number of networked computers that interact to achieve a common goal or perform a particular task. A distributed computing system can include a controlling system and multiple agent systems, often grouped into several different subnets. Distributed computing systems can enable a large-scale service by being affordable solutions to the large-scale tasks required when a large number of users (e.g., people, organizations, other computer systems, and so on) can request the service over a network.

One advantage of distributed computing systems is that the components of the systems (e.g., computers or nodes) can be added or removed from the system to change the capability of the system. Given the large scale of some distributed computing system and the large number of subnets available, the controlling computer system may spend an inordinate amount of time and resources determining whether new computer systems have been added to the distributed computing leading to delays, configuration errors, and other issues.

SUMMARY

The present disclosure relates to systems and methods for automatically discovering nodes in the distributed network and forwarding data for task execution on the nodes based on proxy routers initialized on selected nodes.

According to one innovative aspect, the subject matter described in this disclosure may be embodied in computer-implemented methods that include uploading a network configuration file to a first configuration node and a second configuration node, a first plurality of nodes communicatively connected together in a first computing rack, a second plurality of nodes communicatively connected together in a second computing rack, and the first plurality of nodes including the first configuration node and the second plurality of nodes including the second configuration node; identifying network configuration information for the first plurality of nodes in the network configuration file as being part of the first computing rack; updating network configuration for the first plurality of nodes based on the identified network configuration information for the first computing rack; identifying network configuration information for the second plurality of nodes in the network configuration file as being part of the second computing rack; and updating network configuration for the second plurality of nodes based on the identified network configuration information for the second computing rack.

In general, another innovative aspect of the subject matter described in this disclosure may be embodied in computer systems that include a first computing rack of a first plurality of nodes communicatively connected together. The first plurality of nodes include a first configuration node configured to: receive a network configuration file, identify network configuration information for the first plurality of nodes in the network configuration file as being part of the first computing rack, and update network configuration for the first plurality of nodes based on the identified network configuration information for the first computing rack. The computer systems further include a second computing rack of a second plurality of nodes communicatively connected together. The second plurality of nodes include a second configuration node configured to: receive the network configuration file, identify network configuration information for the second plurality of nodes in the network configuration file as being part of the second computing rack, and update network configuration for the second plurality of nodes based on the identified network configuration information for the second computing rack.

These and other implementations may each optionally include one or more of the following features: that the first plurality of nodes and the second plurality of nodes are linked to an intermediate network; that the first configuration node is further configured to determine that the second computing rack has been properly network configured and is communicatively accessible over the intermediate network, and provide a distributed computing system comprising the first plurality of nodes and the second plurality of nodes as being network configured based on a determination that the second computing rack has been properly network configured and is communicatively accessible over the intermediate network; that updating network configuration for the second plurality of nodes includes configuring a public Layer-3 network address for a publicly accessible node of the second plurality of nodes; that determining that the second computing rack has been properly network configured includes polling connectivity status to the publicly accessible node periodically until connectivity is established, and querying the publicly accessible node on whether the second plurality of nodes have been properly network configured; that the network configuration file is system-wide and comprises Layer-3 network configuration information for the first plurality of nodes and the second plurality of nodes; that the first plurality of nodes and the second plurality of nodes form part of a distributed object storage service with a storage application programming interface (API) served from one or more of a first gateway node within the first plurality of nodes and a second gateway node within the second plurality of nodes; that the first configuration node is further configured to authenticate a computing device to the system, receive confirmation of acceptance of a license agreement from the computing device, receive a set of distributed object storage configuration information for the distributed object storage service from the computing device, apply the set of distributed object storage configuration information to the first plurality of nodes and the second plurality of nodes, and activate use of the distributed object storage service by other computing devices on a connected network by enabling accessibility of the first gateway node and the second gateway node; a network configuration generator configured to receive network configuration information from the first plurality of nodes and the second plurality of nodes, and generate the network configuration file including network configuration information for the first plurality of nodes and the second plurality of nodes; and the network configuration generator is a browser-accessible application served from the first configuration node; determining that the second computing rack has been properly network configured and is communicatively accessible over the intermediate network; providing a distributed computing system comprising the first plurality of nodes and the second plurality of nodes as being network configured based on the determination that the second computing rack has been properly network configured and is communicatively accessible over the intermediate network; authenticating a computing device to the system; receiving confirmation of acceptance of a license agreement from the computing device; receiving a set of distributed object storage configuration information for the distributed object storage service from the computing device; applying the set of distributed object storage configuration information to the first plurality of nodes and the second plurality of nodes; activating use of the distributed object storage service by other computing devices on a connected network by enabling accessibility of the first gateway node and the second gateway node; receiving network configuration information for the first plurality of nodes and the second plurality of nodes; generating an updated network configuration file including network configuration information for the first plurality of nodes and the second plurality of nodes; that receiving network configuration information and generating the network configuration file is performed through a browser-accessible application served from the first configuration node.

Other implementations of one or more of these aspects include corresponding systems, apparatus, and computer programs, configured to perform the actions of the methods, encoded on computer storage devices. It should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
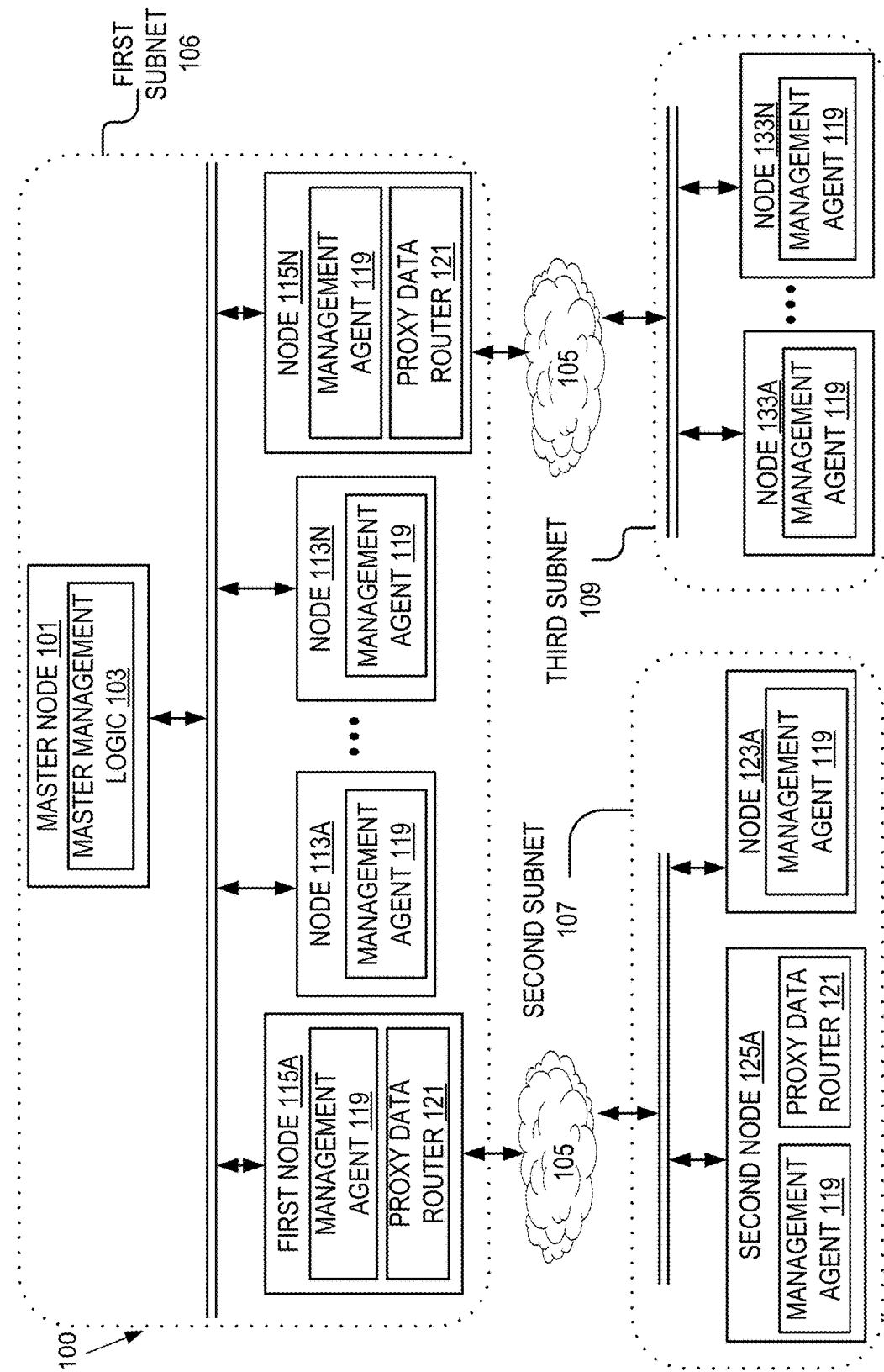
FIG. 1 is a high-level block diagram illustrating an example structure of a distributed network including a plurality of subnetworks.

The present disclosure describes technology, including methods, systems, apparatuses, and computer program products, for automatically discovering nodes in the distributed network system and forwarding data for task execution on the nodes based on proxy routers initialized on selected nodes. In the following description, for purposes of explanation, numerous specific details are set forth to provide a thorough understanding of the various aspects of different embodiments. It will be evident, however, that any particular example embodiment may be practiced without all of the specific details and/or with variations, permutations, and combinations of the various features and elements described herein.

As a non-limiting overview of the technology, a distributed network system may include a master node and a plurality of subnets (or subnetworks). A particular subnet may include a plurality of nodes connected to a router that interconnects the particular subnet. The distributed network system may be dynamic, allowing nodes to be added or removed from subnets and allowing subnets to be added or removed from the distributed network system. A viral discovery mechanism may be used that can efficiently discover and initialize new nodes as they are added to the distributed network system.

A master node may control the distributed network system and assign tasks to various nodes. The master node may include components that monitor the distributed network system, interface with nodes in the network, and generate commands (e.g., instructing particular nodes to complete specific tasks and so on) for the nodes. The master node may itself be included in a subnet. Rather than have the master node directly connect to multiple subnets in the distributed network, at least some nodes may include a proxy data router that can receive and then transmit messages or commands from the master node to another subnet to which they are connected.

A master node may periodically determine whether a new node has been added to the distributed network system by sending a discovery request to one or more nodes on the subnet that includes the master node. In some embodiments, the discovery request may be broadcast to the subnet of which the master node is a part. In further embodiments, the discovery request may be sent to a first node already known to the master node that includes a proxy data router.

Upon receiving the discovery requests, nodes may respond with the requested information. The information requested may include one or more of the nodes IP address, capabilities, current assigned task, specifications, and the path the discovery request took to reach the node. A node that receives the discovery request (including the first node) may respond with the requested node information about itself. Nodes that include a proxy data router, such as the first node, may also forward the discover request to a second node. In some embodiments, the second node may be in a second subnet and the first node may broadcast the discovery request to the second subnet.

In response to receiving the request, the second node may transmit the requested node information to the master node. The second node may also forward the discovery request to one or more other nodes, either in its own subnet or in another subnet. In this way, the discovery request is transmitted through the distributed network system by a series of proxy nodes and any new nodes are able to report the requested information back to the master node upon receiving the discovery request.

Once the second node has responded to the discovery request with the requested discovery information, the master node may issue commands for the second node. In some embodiments, the master node, using information obtained from the second node during the discovery process, may transmit the command to the first node. The first node may then forward that command to the second node using a forwarding controller. In some embodiments, the first node may broadcast the command to the second subnet. In some cases, only the node to which the command is addressed (in this case the second node) may act on the received command. In other cases, the command may implicitly or explicitly be addressed to multiple nodes, and that plurality of nodes may act on the command.

This is advantageous over traditional distributed network systems because it can allow nodes to be added to a plurality of different subnets connected to the distributed network system without direct central oversite. Thus, a central master node can reduce the amount of information that it stores and instead rely on propagation through one or more nodes with proxy data routing capability to forward messages, requests, and commands to nodes in other subnets. This can allow the distributed network system to be run with less power used, less data storage used, fewer processing cycles, and fewer reads and writes to memory.

FIG. 1 is a high-level block diagram illustrating an example structure of a distributed network system 100. In FIG. 1, the example network system 100 may include a first subnet 106, a second subnet 107, and a third subnet 109, which are depicted in dash-lines separately. A subnet is a logical subdivision of the distributed network system 100. For example, in the internet protocol version 4, a subnet is a subdivision that is divided and characterized by a network prefix or a subnet mask, although any suitable subdivision of a network may be applicable. In some embodiments, subnets may be arranged logically in a hierarchical architecture to partition the distributed network system 100 into a tree-like routing structure when discovering nodes and forwarding commands for execution on the nodes.

In the distributed network system 100, an entity may be located at one or more subnets. An entity in a subnet may be communicatively coupled with entities within the same subnet via the subnet, and communicatively coupled with entities from different subnets via one or more networks 105.

The network 105 can be wired or wireless and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc.

In some embodiments, an entity located at a subnet of the distributed network system 100 may be a node (e.g., an agent node). The node may be a computer device, for example, a laptop computer, a desktop computer, a tablet computer, a mobile telephone, a personal digital assistant, a mobile email device, a portable game player, a portable music player, a television with one or more processors embedded therein or coupled thereto or any other electronic device capable of making requests to the distributed network system 100 and receiving responses from the distributed network system 100.

In some embodiments, the node may be a master node 101. The master node 101 may be a computer device configured to manage other nodes in the distributed network system 100. In some embodiments, the master node 101 may include a master management logic 103. The master management logic 103 may provide the operations (e.g., acts, functionality, etc.) and/or structure for identifying the nodes (113A-113N, 115A-115N, 125A, 123A, and 133A-133N) connected to the distributed network system, as discussed elsewhere herein.

In some embodiments, the master management logic 103 initiates the transmission of discovery requests and receives discovery information from nodes who receive the discovery request. The master management logic 103 may also determine which tasks are due to be completed (e.g., based on received requests) and allocates those tasks to one or more nodes for completion.

The node may be a node 113A . . . 113N, 123A . . . 123N, or 133A . . . 133N that includes a management agent 119. The management agent 119 may include the computational logic (e.g., software and/or hardware logic) to provide the operations (acts, functionality, etc.) for performing the tasks assigned to the node (e.g. 113A) by the master node 101. For example, the master node 101 assigns a series of calculations to node 113A. Node 113A receives the instructions and, using the management agent 119, performs the assigned calculations and returns the request results to the master node 101.

In some further embodiments, the node may be a first node 115A, a second node 125A, or node 115N that includes a management agent 119 and a proxy data router 121. The proxy data router may include the computational logic (e.g., software and/or hardware logic) to provide the operations (acts, functionality, etc.) for retransmitting requests (e.g., discovery requests) or commands from the master node 101 to one or more other nodes or subnets in the distributed network system 100. In some embodiments, the node may include one or more other nodes in the distributed network system 100 to which the proxy data router 121 may forward requests and commands. In further embodiments, the proxy data router may broadcast commands and requests. For instance, the proxy data router may broadcast commands and requests as widely as possible within the distributed network system 100, may broadcast commands and requests based on various broadcast thresholds set to help to reduce noise and/or help to ensure accurate discovery, etc.

The master node 101 may be physically located at a first subnet 106, where the master node 101 along with a plurality of other nodes 113A . . . 113N, 115A . . . 115N, 123A . . . 123N, or 133A . . . 133N are arranged in the distributed network system 100. As depicted in FIG. 1, the first node 115A may be communicatively coupled to a first subnet 106, and the second node 125A communicatively coupled to a second subnet 107, and other nodes 133A-133N are communicatively coupled to a third subnet 109. In addition, first node 115A may be also communicatively coupled to the second subnet 107 through network 105.

Although a single master node 101 and other nodes of three subnets are shown in FIG. 1, it should be understood that the distributed network system 100 can contain any number of master nodes 101, other nodes, or subnets. Note that the nodes 113A . . . 113N may be collectively referred as nodes 113. Similarly, the nodes 115A . . . 115N and 133A . . . 133N may be respectively referred as nodes 115 and 133.

Figure 2:
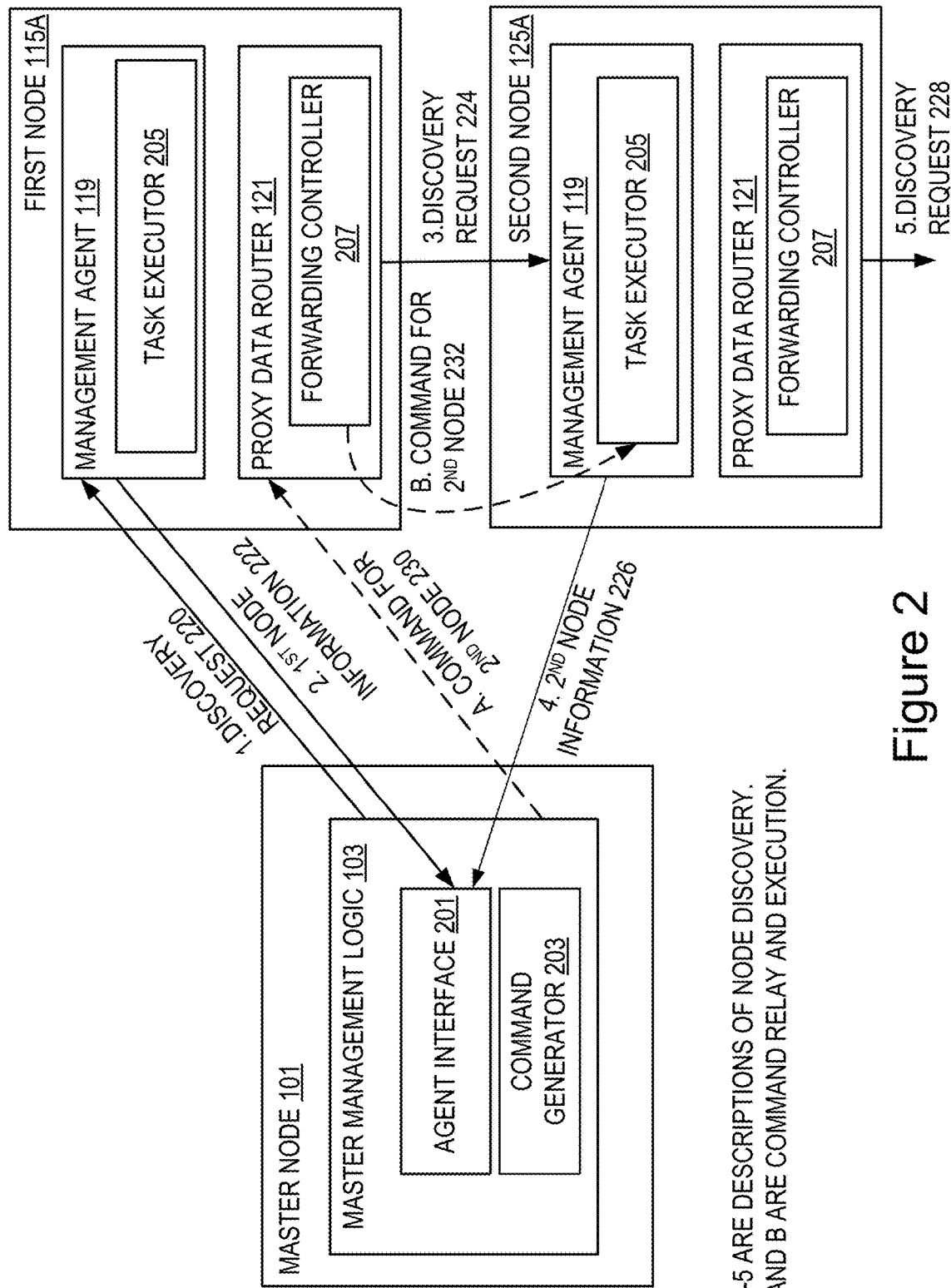
FIG. 2 is a block diagram illustrating an example master node of the distributed network.

FIG. 2 is a block diagram illustrating an example master node 101 of the distributed network in FIG. 1. In the example of FIG. 2, the master node 101 includes master management logic 103. The master management logic 103 includes an agent interface 201 and a command generator 203. The distributed network system 100 in this example includes a first node 115A and a second node 125A.

The master management logic 103 may include the systems, circuitry, and programming that allows the master node 101 to identify, communicate with, and control the nodes (115A and 125A) of the distributed networking system (e.g., system 100 in FIG. 1). The agent interface 201 may transmit discovery requests 220 to a first node 115A. In further embodiments, the agent interface 201 may broadcast discovery requests 220 to the first subnet. In some embodiments, the first node 115 (labelled step 1 in FIG. 2) may be in the same subnet of the distributed networking system (e.g., system 100 in FIG. 1) as the master node 101.

The agent interface 201 may receive the responses sent by nodes 115A and 125A in response to the discovery request 220 (labelled step 2 in FIG. 2). In some embodiments, the discovery request 220 may request specific information from nodes 115A and 125A and the nodes transmit the requested information to the agent interface 201 in response to receiving discovery request 220. Thus, the agent interface 201 receives information 222 from the first node 115A and information 226 (labeled step 4 in FIG. 2) from the second node 125A.

The command generator 203 may analyze currently pending tasks, identifies specific tasks to be completed, and assigns a particular task to a specific node in the distributed network system (e.g., system 100 in FIG. 1). The command generator 203 then transmits commands to perform the task to the node to which it has been assigned. In the depicted example, the command generator 203 has generated a command 226 (labelled step A in FIG. 2) for the second node. The command 230 for the second node may be first transmitted to the first node 115A, which then acts as an intermediary and forwards the command 232 to the assigned node (second node 125A.)

The first node 115A may include a management agent 119 and a proxy data router 121. The management agent 119 includes a task executor 205. In some embodiments, the first node 115A receives a discovery request 220 from the master node 101. The management agent 119 may process the request, determine the information requested, and send a return message (222) that includes information about the first node. In some embodiments, the task executor 205 performs tasks assigned to the first node 115A from the master node 101.

The proxy data router 121 may transmit messages, request, and commands from the master node 101 to one or more other nodes in the distributed network system (e.g., system 100 in FIG. 1). In some embodiments, the proxy data router 121 includes a forwarding controller 207. The forwarding controller 207 may determine which other nodes or subnets in the distributed network system (e.g., system 100 in FIG. 1) the message or command is addressed to.

For example, when the first node 115A receives a discovery request 220 from the master node 101, the proxy data router 121 (potentially using the forwarding controller 207) transmits the discovery request to the second node 125A (224) in a second subnet (or to the nodes in the second subnet). In this example, the second node 125A may be in a different subnet than the master node 101. The second node 125A may respond to the discovery request 224 with information (226) about the second node and, using its own proxy data router 121, forward the discovery request 228 to one or more other nodes. In some embodiments, the information (226) about the second node transmitted to the master node 101 also includes network path information that describes the path that the discovery request took through the network to get to the second node 125A. The master node 101 can use this information to transmit commands or other requests to the second node 125A via the network path described.

In some embodiments, the proxy data router 121 of the first node 115A receives a command 230 (labeled step A in FIG. 2) for the second node 125A from the master node 101. This command 230 may be first sent to the first node 115A because the network path that the master node 101 stores for the second node 125A includes the first node 115A. In further embodiments, the master node 101 may broadcast the command 230 for the second node to nodes on its subnet and any node that currently have the network address of the second node 125A forward (232) the command to the second node 125A using the forwarding controller 207.

Figure 3:
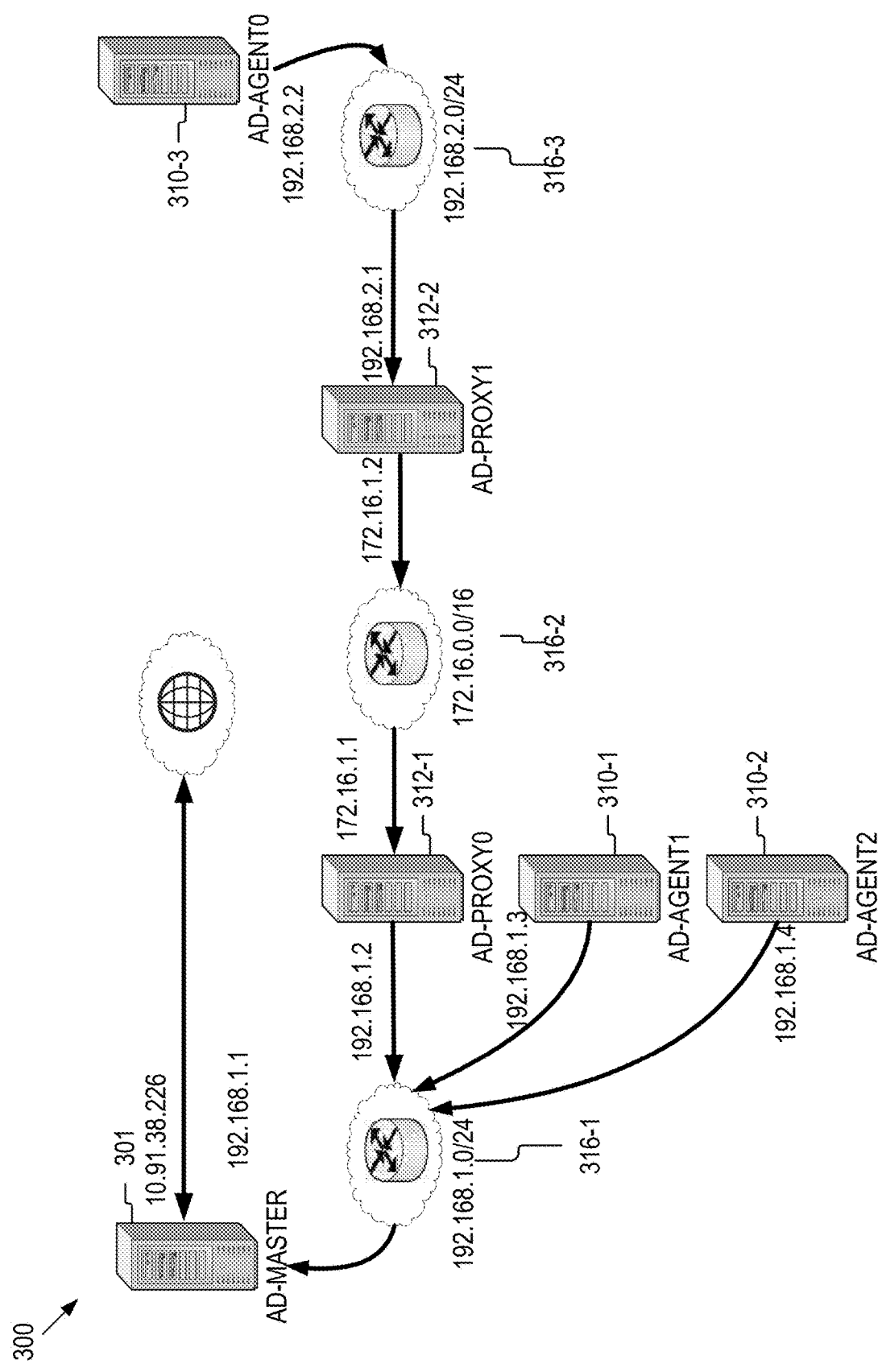
FIG. 3 is a block diagram illustrating an example implementation of a distributed network.

FIG. 3 is a block diagram illustrating an example implementation of a distributed network system 300. In some embodiments, distributed network system 300 includes an ad-master 301, a plurality of routers (316-1 to 316-3), one or more ad-proxy nodes (proxy nodes 312-1 to 312-2), and a plurality of ad-agent (nodes 310-1 to 310-3).

In this example, the nodes connected to a router 316 are part of the subnet created by that router 316. For example, the nodes connected to the first router 316-1 include ad-master 301, ad-proxy0 312-1, ad-agent1 310-1, and ad-agent2 310-2. These nodes are included by the first subnet (e.g., subnet 106 in FIG. 1) and have the same common bit group as the most significant bits of their IP address. Thus, the IP address for a node in a subnet includes a routing or subnet prefix (identifying a particular subnet) and a host number (identifying the particular node in the subnet). For example, for subnet 1 316-1, the nodes may have the subnet prefix 192.168.1.0/24, where the /24 indicates the length in bits of the subnet prefix.

The ad-master 301 can communicate with the nodes in the first subnet through the first router 316-1 to send requests and commands and to receive information in response. For example, the ad-master 301 can broadcast a discovery request to nodes connected to the first router 316-1 (e.g., the nodes in the first subnet 301, 312-1, 310-1, and 310-2). If any nodes have been connected or changed status since the last such discovery request, the ad-master 301 may receive data from the node and update the node information stored on the ad-master 301 to reflect the changes.

In this example, the nodes attached to the first router 316-1 (301, 312-1, 310-1, and 310-2) may respond to the discovery request by sending node identifying information to the ad-master 301. In addition, ad-proxy0 312-1 may also transmit the discover request to a second subnet connected to router 2 316-2. In this example, the second subnet only includes a single node, ad-proxy1 312-2. Ad-proxy1 312-2 may reply to the discovery request either by transmitting the response to the ad-master 301 directly, or by transmitting the response to ad-proxy0 312-1 through router 2 316-2 and having ad-proxy0 312-1 relay the response to the ad-master 301. Ad-proxy1 312-2 may also act as a proxy and forward the discovery request to a third subnet that may be connected to router 3 316-3.

As shown in the particular example depicted in FIG. 3, ad-agent0 310-3 may be the only other node attached to router 3. When the discovery request is received, ad-agent0 310-3 may respond with the requested information, which may be transmitted either directly to ad-master 301 or may be transmitted back along the network path that the discovery request took. Such a path would include passing through router 3 316-3, ad-proxy1 312-2, router 2 316-2, ad-proxy0 312-1, and router 1 316-1, before reaching the ad-master 301.

Figure 4:
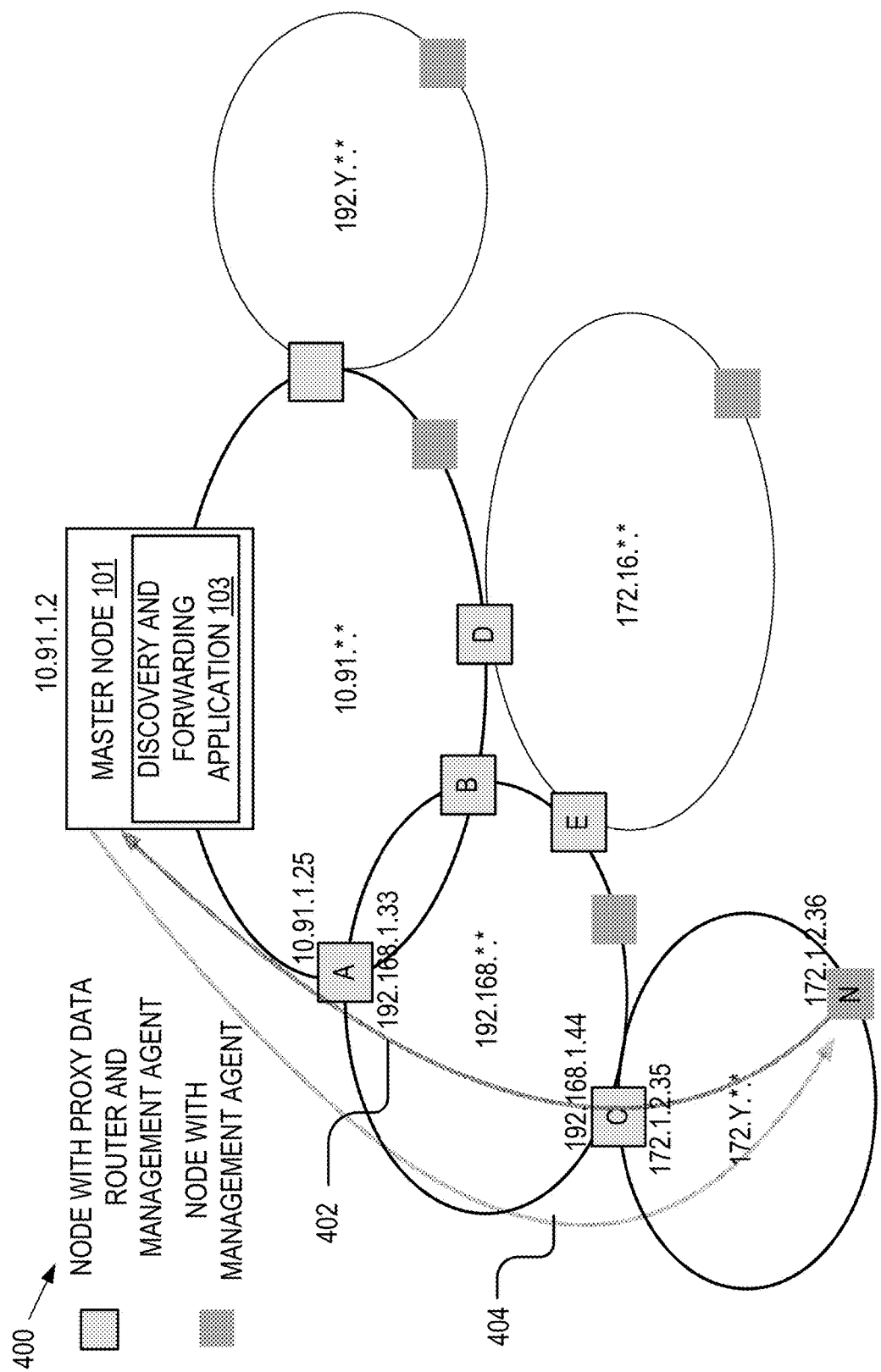
FIG. 4 is a block diagram illustrating an example hierarchic structure of the distributed network depicted in FIG. 3.

FIG. 4 is a block diagram illustrating an example hierarchic structure of the distributed network system 400 depicted in FIG. 3. In some embodiments, the distributed network system 400 includes a master node 101 and a plurality of nodes (410-1 to 410-6 and 412-1 to 412-N). The plurality of nodes may include a plurality of nodes that include both a proxy data router and a management agent (410-1 to 410-6) and a plurality of nodes that include a management agent without a proxy data router (412-1 to 412-N).

Each node (including the master node 101) may be connected to a subnet (420-1 to 420-5). A subnet may include a router (e.g., routers 316-1 to 316-3 in FIG. 3) to which the nodes on the subnet connect. The router may assign a node on the subnet 420 a subnet specific IP address. In the example depicted in FIG. 4, the IP addresses for nodes A (410-1), C (410-3), and N (412-N) are displayed. The IP addresses for other nodes are allocated and assigned but not shown for better readability.

In some embodiments, nodes that include a proxy data router (410-1 to 410-6) may be connected to more than one subnet and thus may be assigned to different subnet IP addresses. For example, node A 410-1 may be connected to subnet 1 420-1 with an IP address of 10.91.1.25 and may be connected to subnet 2 420-2 with an assigned IP address of 192.168.1.33. In this way, node A (and other nodes with a proxy data router) can forward messages, requests, and commands to or from the master node 101 from one subnet to another.

In this example, node N 412-N transmits discovery information 402 associated with node N 412-N to the master node 101. In some embodiments, this transmission may be in response to a discovery request from the master node 101. In some embodiments, the discovery information 402 passes from node N 312-N in subnet 3 420-3, through node C 410-3 to subnet 2 420-2. The discovery information 402 may then be passed to node A 410-1 (which may be connected to subnet 2 420-2), which forwards the discovery information to the master node 101 through subnet 1 420-1. In further embodiments, node N 412-N may transmit the discovery information 402 directly to the master node 101.

The master node 101 may transmit a command or other message 404 for node N 412-N to node N 412-N. In some embodiments, the master node 101 may store node N's 412-N specific IP address and may be able to transmit the information to node N 412-N directly. In further embodiments, master node 101 may have a record indicating the first proxy agent on the path to node N 412-N (in this case node A 410-1) and may transmit the information to that node to be forwarded to node N through a path such as subnet 1 420-1, node A 410-1, second subnet 420-2, node C 410-3, and third subnet 420-3 before reaching node N 412-N.

Figure 5:
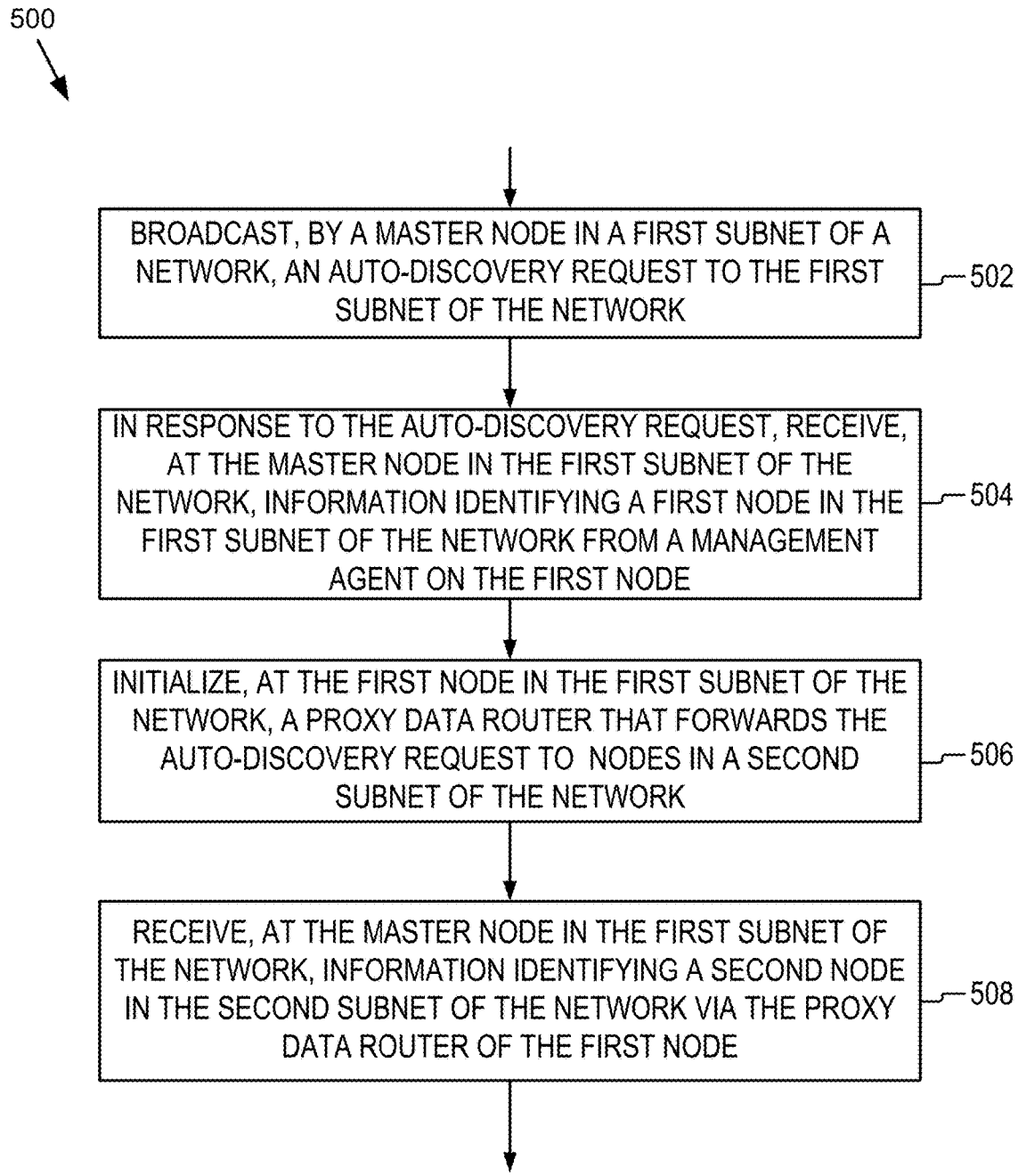
FIG. 5 is a flowchart of an example method for auto-discovery of nodes in a distributed network.

FIG. 5 is a flowchart of an example method 500 for auto-discovery of nodes in a distributed network. At 502, a master node (e.g., master node 101 in FIG. 1) in a first subnet (e.g., subnet 106 of FIG. 1) of a network may broadcast an auto-discovery request to the first subnet of the network. At 504, in response to the auto-discovery request, the master node in the first subnet of the network may receive information identifying a first node in the first subnet of the network from a management agent on the first node. At 506, the first node in the first node of the network may initialize a proxy data router that forwards the auto-discovery request to nodes in a second subnet of the network. At 508, the master node in the first subnet of the network may receive information identifying a second node in the second subnet of the network via the proxy data router of the first node.

Figure 6A:
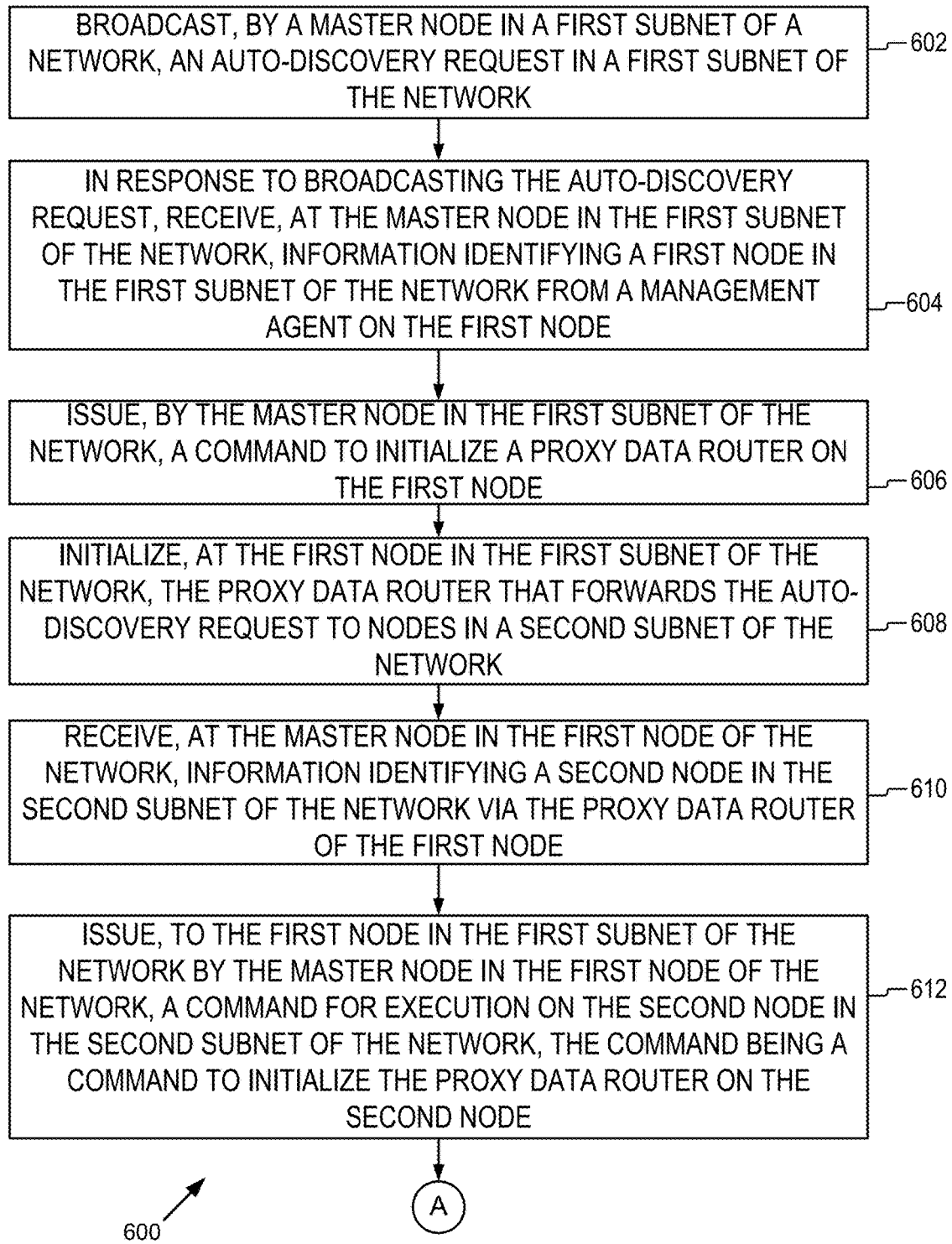
FIGS. 6A and 6B are a flowchart of an example method for auto-discovering nodes in a distributed network and forwarding data for task execution on the nodes based on proxy routers initialized on selected nodes.
Figure 6B:
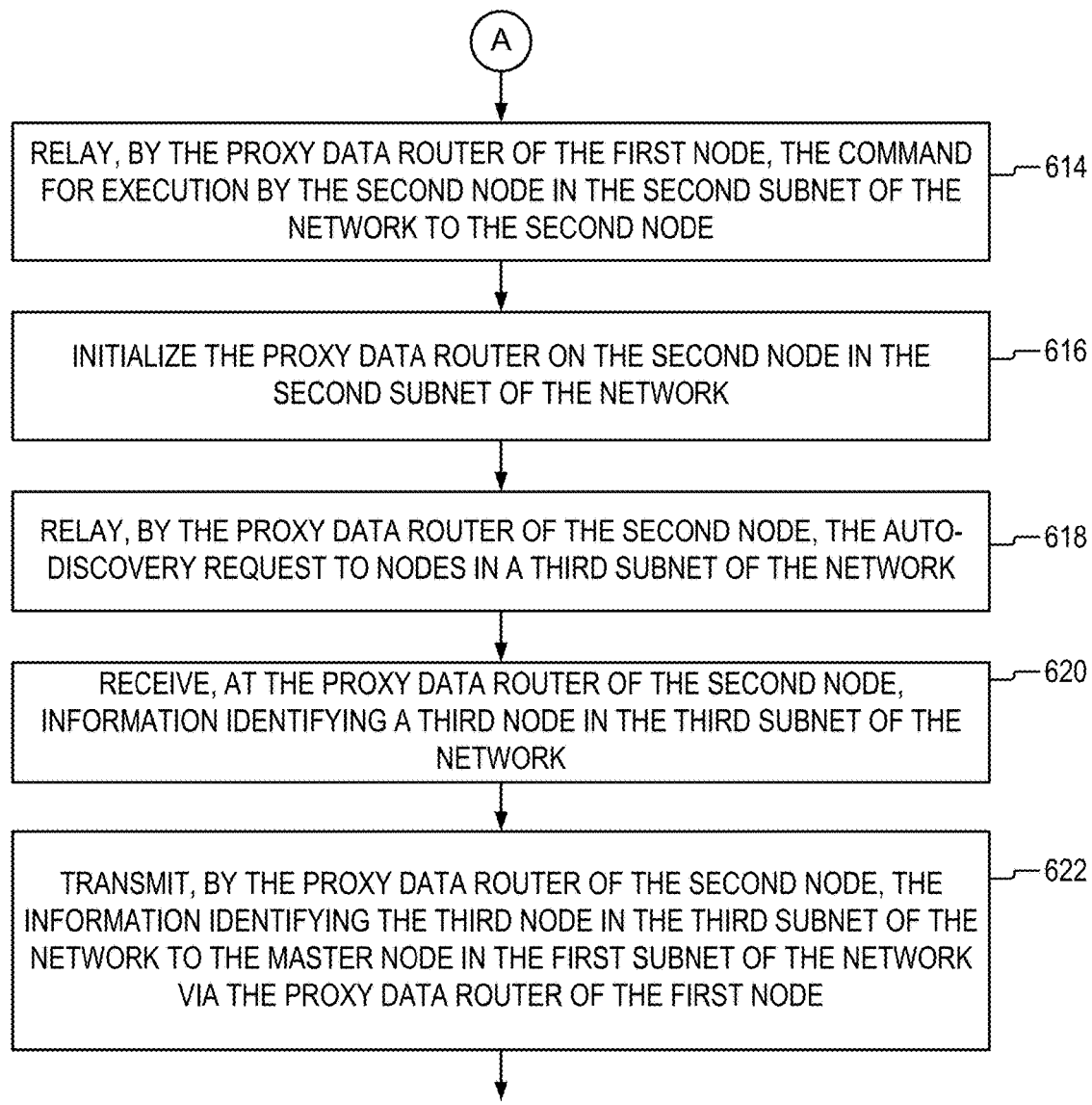

FIGS. 6A and 6B depict a flowchart of an example method 600 for auto-discovering nodes in a distributed network and forwarding data for task execution on the nodes based on proxy routers initialized on selected nodes. At 602, a master node in a first subnet of a network may broadcast an auto-discovery request in the first subnet of the network. At 604, in response to the auto-discovery request, the master node in the first subnet of the network may receive information identifying a first node in the first subnet of the network from a management agent on the first node. At 606, the master node in the first subnet of the network may issue a command to initialize a proxy data router on the first node.

At 608, the first node in the first subnet of the network may initialize the proxy data router that forwards the auto-discovery request to nodes in a second subnet of the network. In some embodiments, the first plurality of nodes and the second plurality of nodes may be linked to an intermediate network. In some embodiments, the first plurality of nodes and the second plurality of nodes may form part of a distributed object storage service with a storage application program interface (API) served from one or more of a first gateway node within the first plurality of nodes, and a second gateway node within the second plurality of nodes, etc.

The master node may determine when a second computing rack has been properly network configured and is communicatively accessible over the intermediate network. For instance, the master node may poll connectivity status to the publicly accessible node periodically until connectivity is established and query the publicly accessible node on whether the second plurality of nodes have been properly network configured.

The master node may update network configuration for the second plurality of nodes based on the identified network configuration information for the second computing rack. In some embodiments, updating network configuration for the second plurality of nodes includes configuring a public network address for a publicly accessible node of the second plurality of nodes.

At 610, the master node in the first subnet of the network may receive information identifying a second node in the second subnet of the network via the proxy data router of the first node. At 612, the master node in the first subnet of the network issues, to the first node in the first subnet of the network, a command for execution on the second node in the second subnet of the network, the command being a command to initialize the proxy data router on the second node.

Referring to FIG. 6B, at 614, the proxy data router of the first node may relay the command for execution by the second node in the second subnet of the network to the second node. At 616, the second node in the second subnet of the network may initialize the proxy data router on the second node. At 618, the proxy data router of the second node may relay the auto-discovery request to nodes in a third subnet of the network. At 620, the proxy data router of the second node may receive information identifying a third node in the third subnet of the network. At 622, the proxy data router of the second node may transmit the information identifying the third node in the third subnet of the network to the master node in the first subnet of the network via the proxy data router of the first node.

Figure 7A:
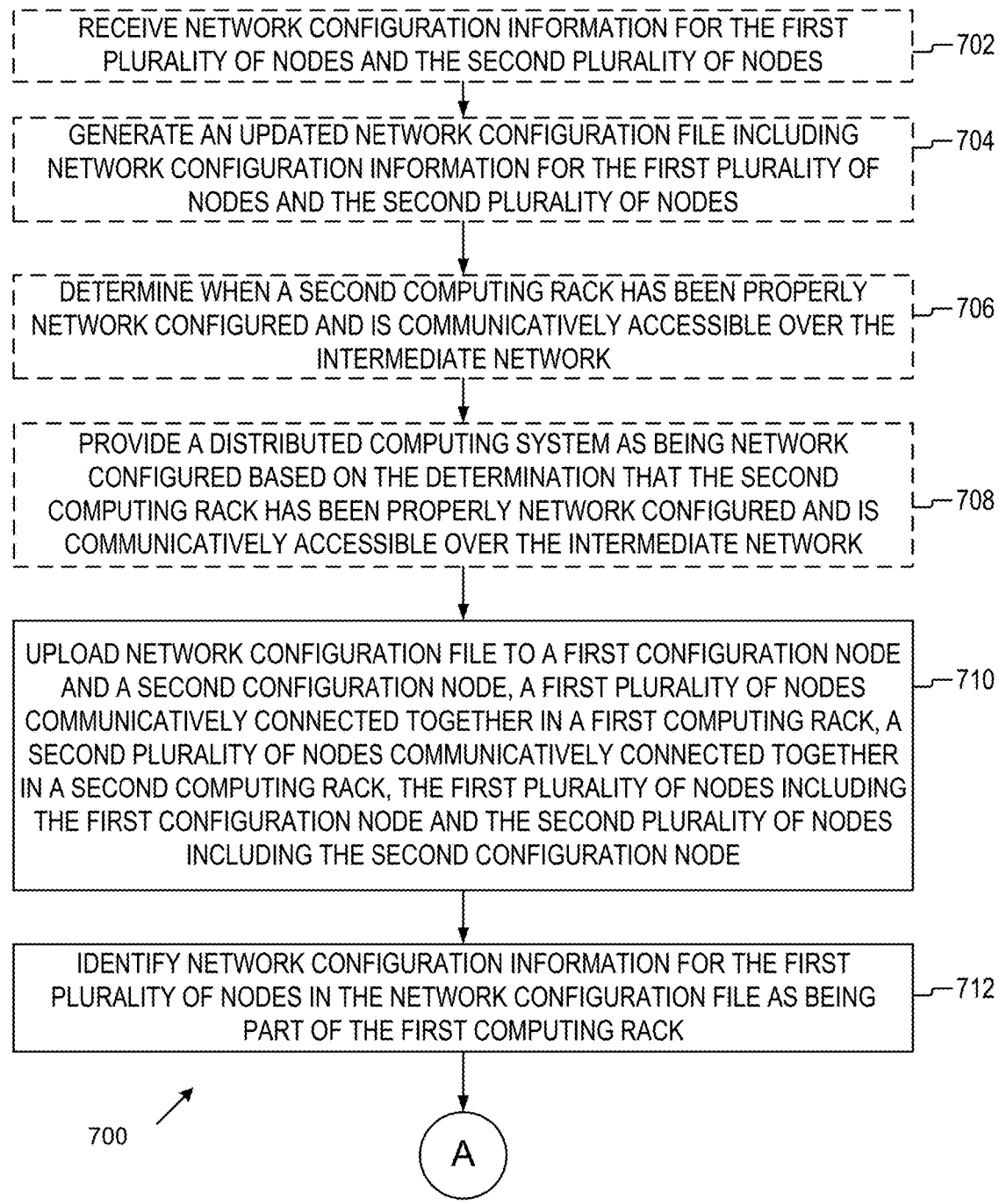
FIGS. 7A-7C are flowcharts of an example method for viral system discovery and installation for distributed networks.

FIG. 7A is a flowchart of an example method 700 for viral system discovery and installation for distributed networks. Each of the operations shown in FIG. 7A may correspond to instructions stored in a computer memory or computer-readable storage medium. In the drawings, some optional operations are indicated by dashed lines (e.g., boxes with dashed-line borders), depending on the embodiment, although this nomenclature is provided by way of convenience and is not intended to be strictly interpreted. In some embodiments, the method described in FIG. 7A may be performed by the distributed network system 100, although aspects of the method described can also be performed by other suitable configuration of electronic hardware, such as non-distributed configurations.

In some embodiments, the method 700 may be performed on and/or by a distributed network system (e.g., system 100 in FIG. 1) including a master node, a first plurality of nodes, a second plurality of nodes, etc. In some embodiments, the first plurality of nodes and the second plurality of nodes may be linked to an intermediate network.

The master node (e.g., node 101 in FIG. 1) may receive (702) network configuration information for the first plurality of nodes and the second plurality of nodes. The master node (e.g., node 101 in FIG. 1) may generate (704) an updated network configuration file including network configuration information for the first plurality of nodes and the second plurality of nodes. A network configuration file may be generated to cover the system-wide configuration of the devices of the network(s) of interest, or may be generated to cover a portion of the devices in the network(s). In some embodiments, receiving network configuration information and generating network configuration file may be performed through a browser-accessible application served from the first configuration node.

In some embodiments, the first plurality of nodes and the second plurality of nodes form part of a distributed object storage service with a storage API served from one or more of a first gateway node within the first plurality of nodes, and a second gateway node within the second plurality of nodes, etc.

The master node (e.g., node 101 in FIG. 1) may determine (706) when a second computing rack has been properly network configured and may be communicatively accessible over the intermediate network. The master node (e.g., node 101 in FIG. 1) may provide (708) a distributed computing system as being network configured based on the determination that the second computing rack has been properly network configured and may be communicatively accessible over the intermediate network.

The master node (e.g., node 101 in FIG. 1) may upload (710) a network configuration file to a first configuration node and a second configuration node, a first plurality of nodes communicatively connected together in a first computing rack, a second plurality of nodes communicatively connected together in a second computing rack, the first plurality of nodes including the first configuration node and the second plurality of nodes including the second configuration node.

In some embodiments, the network configuration file may comprise layer network configuration information (e.g., Layer-3, etc.) for the first plurality of nodes and the second plurality of nodes, although additional and/or alternative suitable configuration information is also possible and contemplated.

The master node (e.g., node 101 in FIG. 1) may identify (712) network configuration information for the first plurality of nodes in the network configuration file as being part of the first computing rack.

Figure 7B:
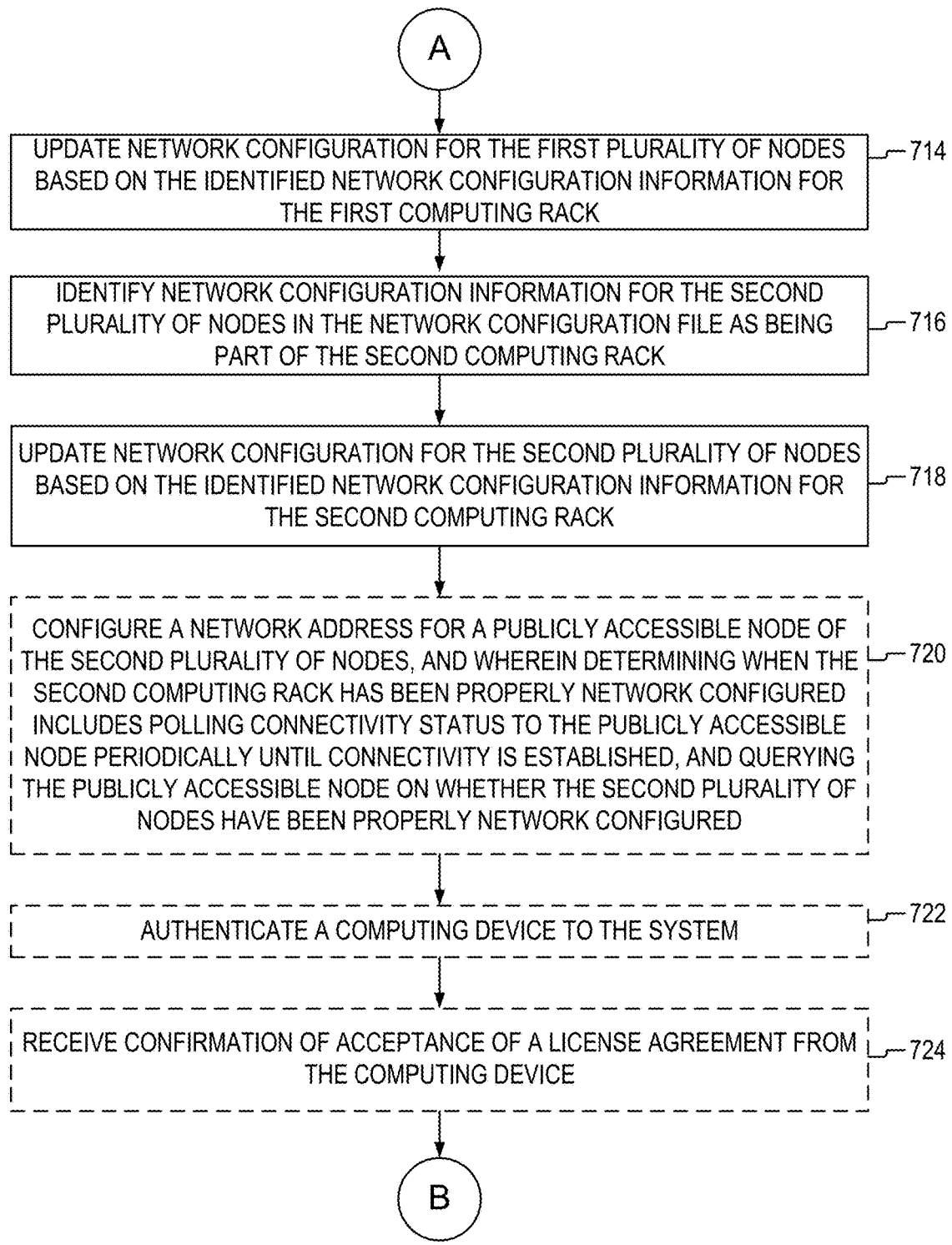

FIG. 7B is a flowchart of an example method for viral system discovery and installation for distributed networks. Each of the operations shown in FIG. 7B may correspond to instructions stored in a computer memory or computer-readable storage medium. In some embodiments, the method described in FIG. 7B may be performed by the distributed network system 100. However, the method described can also be performed by any other suitable configuration of electronic hardware. The method in FIG. 7B continues the method 700 shown in FIG. 7A.

The master node (e.g., node 101 in FIG. 1) may update (714) network configuration for the first plurality of nodes based on the identified network configuration information for the first computing rack. The master node (e.g., node 101 in FIG. 1) may identify (716) network configuration information for the second plurality of nodes in the network configuration file as being part of the second computing rack.

The master node (e.g., node 101 in FIG. 1) may update (718) network configuration for the second plurality of nodes based on the identified network configuration information for the second computing rack. In some embodiments, updating network configuration for the second plurality of nodes includes configuring (720) a network address for a publicly accessible node of the second plurality of nodes, such but not limited to a Layer-3 network address. The master node may determine when the second computing rack has been properly network configured. This may include polling connectivity status to the publicly accessible node periodically until connectivity is established, and querying the publicly accessible node on whether the second plurality of nodes have been properly network configured.

The master node (e.g., node 101 in FIG. 1) or some other authentication component of the distributed network system, may authenticate (722) a computing device to the system. The master node (e.g., node 101 in FIG. 1) may receive (724) confirmation of acceptance of a license agreement from the computing device.

Figure 7C:
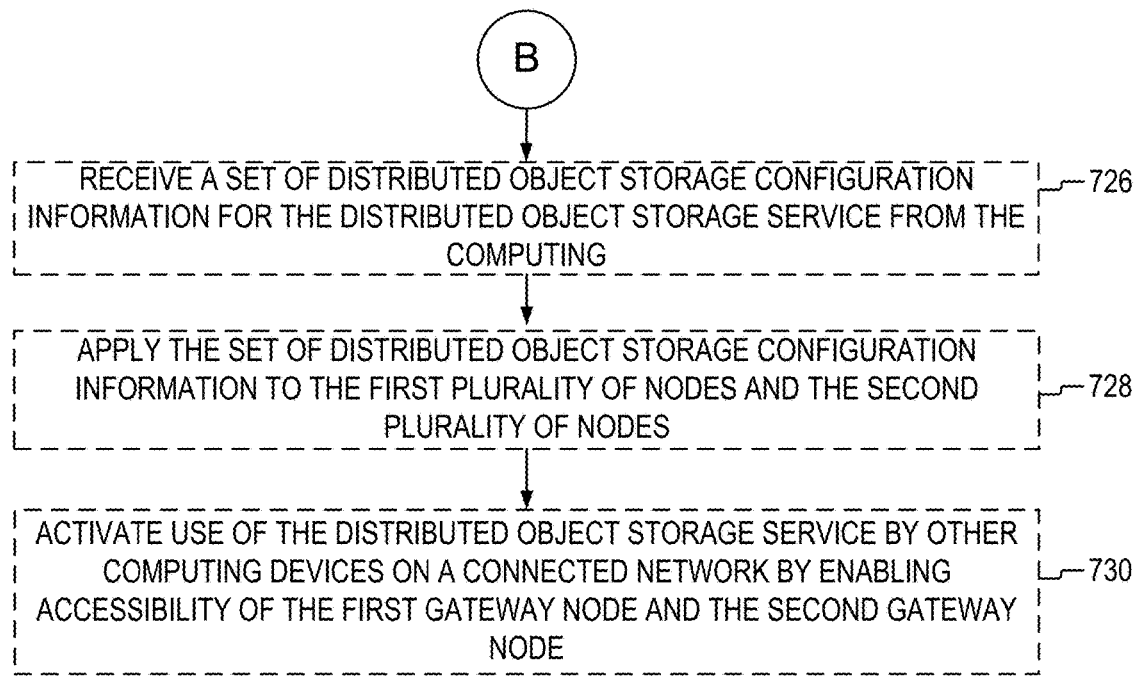

FIG. 7C is a flowchart of an example method for viral system discovery and installation for distributed networks. Each of the operations shown in FIG. 7C may correspond to instructions stored in a computer memory or computer-readable storage medium. Optional operations are indicated by dashed lines (e.g., boxes with dashed-line borders). In some embodiments, the method described in FIG. 7C may be performed by the distributed network system 100. However, the method described can also be performed by any other suitable configuration of electronic hardware. The method in FIG. 7C continues the method 700 shown in FIGS. 7A and 7B.

The master node (e.g., node 101 in FIG. 1) may receive (726) a set of distributed object storage configuration information for the distributed object storage service from the computing device. The master node (e.g., node 101 in FIG. 1) may apply (728) the set of distributed object storage configuration information to the first plurality of nodes and the second plurality of nodes. The master node (e.g., node 101 in FIG. 1) may activate (730) use of the distributed object storage service by other computing devices on a connected network by enabling accessibility of the first gateway node and the second gateway node.

Technology for auto-discovering nodes in a distributed network and forwarding data for task execution on the nodes based on proxy routers initialized on selected nodes have been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "implementation(s) or embodiment(s)" means that a particular feature, structure, or characteristic described in connection with the implementation may be included in at least one implementation or embodiment of the disclosed technologies. The appearances of the term "implementation(s) or embodiment(s)" in various places in the specification are not necessarily all referring to the same implementation(s) or embodiment(s).

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of data storage device including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of a hardware implementation, a software implementation running on hardware, and/or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the method steps. The structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system comprising:
a first computing rack comprising a first plurality of nodes communicatively connected together in a first subnet of a network, wherein the first plurality of nodes includes a first configuration node configured to:
   receive a network configuration file;
   identify network configuration information for the first plurality of nodes in the network configuration file as being part of the first computing rack; and
   update network configuration for the first plurality of nodes based on the identified network configuration information for the first computing rack; and
a second computing rack comprising a second plurality of nodes communicatively connected together in a second subnet of the network that is different from the first subnet of the network, wherein the second plurality of nodes includes a second configuration node configured to:
   receive the network configuration file, wherein a proxy data router in the first plurality of nodes is configured to forward the network configuration file from the first subnet to the second configuration node in the second subnet;
   identify network configuration information for the second plurality of nodes in the network configuration file as being part of the second computing rack; and
   update network configuration for the second plurality of nodes based on the identified network configuration information for the second computing rack.

2. The system of claim 1, wherein:
the first plurality of nodes and the second plurality of nodes are linked to an intermediate network; and
the first configuration node is further configured to:
   determine that the second computing rack has been properly network configured and is communicatively accessible over the intermediate network; and
   provide a distributed computing system comprising the first plurality of nodes and the second plurality of nodes as being network configured based on the determination that the second computing rack has been properly network configured and is communicatively accessible over the intermediate network.

3. The system of claim 2, wherein:
updating network configuration for the second plurality of nodes includes configuring a public Layer-3 network address for a publicly accessible node of the second plurality of nodes; and
determining that the second computing rack has been properly network configured includes:
   polling connectivity status to the publicly accessible node periodically until connectivity is established; and
   querying the publicly accessible node regarding whether the second plurality of nodes have been properly network configured.

4. The system of claim 1, wherein the network configuration file is system-wide and comprises Layer-3 network configuration information for the first plurality of nodes and the second plurality of nodes.

5. The system of claim 1, wherein the first plurality of nodes and the second plurality of nodes form part of a distributed object storage service with a storage application programming interface (API) served from one or more of a first gateway node within the first plurality of nodes and a second gateway node within the second plurality of nodes.

6. The system of claim 5, wherein the first configuration node is further configured to
   authenticate a computing device to the system;
   receive, from the computing device, confirmation of acceptance of a license agreement;
   receive, from the computing device, a set of distributed object storage configuration information for the distributed object storage service;
   apply the set of distributed object storage configuration information to the first plurality of nodes and the second plurality of nodes; and
   activate use of the distributed object storage service by other computing devices on a connected network by enabling accessibility of the first gateway node and the second gateway node.

7. The system of claim 1, further comprising:
a master node configured to:
   receive network configuration information from the first plurality of nodes and the second plurality of nodes; and generate the network configuration file including network configuration information for the first plurality of nodes and the second plurality of nodes.

8. The system of claim 7, wherein the master node includes a browser-accessible application served from the first configuration node.

9. A computer-implemented method comprising:
uploading a network configuration file to a first configuration node and a second configuration node, wherein:
  a first plurality of nodes is communicatively connected together in a first computing rack in a first subnet of a network;
  a second plurality of nodes is communicatively connected together in a second computing rack in a second subnet of the network that is different from the first subnet of the network;
  the first plurality of nodes includes the first configuration node;
  the second plurality of nodes includes the second configuration node; and
  a proxy data router in the first plurality of nodes forwards the network configuration file from the first subnet to the second configuration node in the second subnet,
identifying network configuration information for the first plurality of nodes in the network configuration file as being part of the first computing rack;
updating network configuration for the first plurality of nodes based on the identified network configuration information for the first computing rack;
identifying network configuration information for the second plurality of nodes in the network configuration file as being part of the second computing rack; and
updating network configuration for the second plurality of nodes based on the identified network configuration information for the second computing rack.

10. The computer-implemented method of claim 9, wherein:
the first plurality of nodes and the second plurality of nodes are linked to an intermediate network; and
the method further comprises:
  determining that the second computing rack has been properly network configured and is communicatively accessible over the intermediate network; and
  providing a distributed computing system comprising the first plurality of nodes and the second plurality of nodes as being network configured based on the determination that the second computing rack has been properly network configured and is communicatively accessible over the intermediate network.

11. The computer-implemented method of claim 10, wherein:
updating network configuration for the second plurality of nodes includes configuring a public Layer-3 network address for a publicly accessible node of the second plurality of nodes; and
determining that the second computing rack has been properly network configured includes:
  polling connectivity status to the publicly accessible node periodically until connectivity is established; and
  querying the publicly accessible node regarding whether the second plurality of nodes have been properly network configured.

12. The computer-implemented method of claim 9, wherein the network configuration file is system-wide and comprises Layer-3 network configuration information for the first plurality of nodes and the second plurality of nodes.

13. The computer-implemented method of claim 9, wherein the first plurality of nodes and the second plurality of nodes form part of a distributed object storage service with a storage application programming interface (API) served from one or more of a first gateway node within the first plurality of nodes and a second gateway node within the second plurality of nodes.

14. The computer-implemented method of claim 13, further comprising:
authenticating a computing device to a system;
receiving, from the computing device, confirmation of acceptance of a license agreement;
receiving, from the computing device, a set of distributed object storage configuration information for the distributed object storage service;
applying the set of distributed object storage configuration information to the first plurality of nodes and the second plurality of nodes; and
activating use of the distributed object storage service by other computing devices on a connected network by enabling accessibility of the first gateway node and the second gateway node.

15. The computer-implemented method of claim 9, further comprising:
receiving network configuration information for the first plurality of nodes and the second plurality of nodes; and
generating an updated network configuration file including network configuration information for the first plurality of nodes and the second plurality of nodes.

16. The computer-implemented method of claim 15, wherein receiving the network configuration information and generating the updated network configuration file is performed through a browser-accessible application served from the first configuration node.

17. A system, comprising:
at least one processor;
at least one memory;
means for uploading a network configuration file to a first configuration node and a second configuration node, wherein:
  a first plurality of nodes is communicatively connected together in a first computing rack in a first subnet of a network;
  a second plurality of nodes is communicatively connected together in a second computing rack in a second subnet of the network that is different from the first subnet of the network;
  the first plurality of nodes includes the first configuration node;
  the second plurality of nodes includes the second configuration node; and
  a proxy data router in the first plurality of nodes is configured to forward the network configuration file from the first subnet to the second configuration node in the second subnet,
means for identifying network configuration information for the first plurality of nodes in the network configuration file as being part of the first computing rack;
means for updating network configuration for the first plurality of nodes based on the identified network configuration information for the first computing rack;

means for identifying network configuration information for the second plurality of nodes in the network configuration file as being part of the second computing rack; and means for updating network configuration for the second plurality of nodes based on the identified network configuration information for the second computing rack.

18. The system of claim 17, wherein:

the first plurality of nodes and the second plurality of nodes are linked to an intermediate network; and the system further comprises:

means for determining that the second computing rack has been properly network configured and is communicatively accessible over the intermediate network; and means for providing a distributed computing system comprising the first plurality of nodes and the second plurality of nodes as being network configured based on the determination that the second computing rack has been properly network configured and is communicatively accessible over the intermediate network.

19. The system of claim 18, wherein:

updating network configuration for the second plurality of nodes includes configuring a public Layer-3 network address for a publicly accessible node of the second plurality of nodes; and determining that the second computing rack has been properly network configured includes:

polling connectivity status to the publicly accessible node periodically until connectivity is established; and querying the publicly accessible node regarding whether the second plurality of nodes have been properly network configured.

20. The system of claim 17, further comprising:

means for receiving network configuration information for the first plurality of nodes and the second plurality of nodes; and means for generating the network configuration file including network configuration information for the first plurality of nodes and the second plurality of nodes.

* * * * *